United States Patent
Collard et al.

(10) Patent No.: US 7,555,607 B2
(45) Date of Patent: Jun. 30, 2009

(54) PROGRAM THREAD SYNCRONIZATION FOR INSTRUCTION CACHELINES

(75) Inventors: Jean-Francois C. P. Collard, Sunnyvale, CA (US); Norman Paul Jouppi, Palo Alto, CA (US); Michael S. Schlansker, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 625 days.

(21) Appl. No.: 11/271,535

(22) Filed: Nov. 10, 2005

(65) Prior Publication Data

US 2007/0113232 A1  May 17, 2007

(51) Int. Cl.
*G06F 12/00* (2006.01)

(52) U.S. Cl. .................. 711/125; 711/151; 711/154; 718/101; 718/108

(58) Field of Classification Search .............. 711/125, 711/151, 154; 718/101, 118, 108
See application file for complete search history.

(56) References Cited

U.S. PATENT DOCUMENTS

| | | | |
|---|---|---|---|
| 5,611,070 | A | 3/1997 | Heidleberger et al. |
| 5,923,855 | A | 7/1999 | Yamazaki |
| 6,216,174 | B1 | 4/2001 | Scott et al. |
| 6,263,406 | B1 | 7/2001 | Uwano et al. |
| 2004/0187118 | A1 | 9/2004 | Blainey et al. |
| 2005/0050374 | A1 | 3/2005 | Nakamura et al. |
| 2005/0283780 | A1* | 12/2005 | Karp et al. ............. 718/100 |
| 2007/0113233 | A1 | 5/2007 | Collard et al. |

FOREIGN PATENT DOCUMENTS

WO  WO 9926148  5/1999

OTHER PUBLICATIONS

Zhang et al: "Busy-Wait Barrier Sync. Using Distrubted Counters" w/Local Sensors. WOMAT 03, (online) Jun. 23, 2003 www.springerlink.com/content/at05ttvlfngbqgpp/fulltext.pdf>.
Masahiko Iwani et al: Tagged Communication ansd Sync. Memory for Multiprocessor-on-a-chip Sys & comp in JP, Wiley, Hoboken, NJ, US vol. 32, on Apr. 4, 2001, pp. 1-13.
Lee J et al: Synchronization with Multiproccessor caches. Proceedings of the Annual International Symposium on Computer Architecture, Seattle, May 18-31, 1990 pp. 33.
Beckmann C J et al: Fast Barrier Sync. Hardware. Proceedings of the Supercomputing Conf. NY, Nov. 12-16, 1990, Washington, IEEE comp. SOC, PRess, US vol. Conf. 3 pp. 180-189.
J Sampson et al: Fast Synch. for Chip Multiporcessor. AMC Sigarch Special Issue Das CMO'05 (online) Nov. 13, 2005 pp. 64-69, www.cse.ucsd.edu/{rakumar/dasCMPO5/papter07.pdf.
G. Almási et al., Design and implementation of message-passing services for the Blue Gene/L supercomputer, IBM Journal of Research and Development, Mar. 2005, 49(2/3):393-406, International Business Machines Corp., Armonk, NY.

(Continued)

*Primary Examiner*—Stephen C Elmore

(57) ABSTRACT

In a method of and system for program thread synchronization, an instruction cache line is determined each of a plurality of program threads to be synchronized. For each processor executing one or more of the threads to be synchronized, execution of the thread is halted at a barrier by rendering the determined instruction cache line unavailable. Execution of the threads resumes by rendering the determined instruction cache lines available.

30 Claims, 6 Drawing Sheets

OTHER PUBLICATIONS

Carl J. Beckman et al., Fast Barrier Synchronization Hardware, Proceedings of the 1990 conference on Supercomputing, 1990, pp. 180-189, IEEE Computer Society Press, Los Alamitos, CA.

John M. Mellor-Crummey et al., Algorithms for Scalable Synchronization on Shared-Memory Multiprocessors, ACM Transactions on Computer Systems, 1991, 9(1):21-56, ACM Press, New York, NY.

* cited by examiner

```
                                                            200
      ┌ # Reg $17 = &InvalidateMe (A+L in the text)
      │
      │ # The head begins here
  202 ┤ Barrier:              # At Address A
      │     ICBI $17
      │     ISYNC $17
      │     # Possibly nops to pad up to line boundary
      └ # ---- L1 I-cache line boundary
      ┌ # The tail begins here
      │ InvalidateMe:         # At address A+L
  204 ┤     ICBI $18
      │     ret               # return from barrier
      └     # Possibly nops to pad up to line boundary
```

FIG. 2

| Barrier # | Address A 302 | Address E 304 | Counter C 306 | Pending Vector 308 | Exited Vector 310 | Cache Line Content 312 | Valid Bit 314 |
|---|---|---|---|---|---|---|---|
| 1 | $A_1$ | $E_1$ | $C_1$ | $PV_1$ | $EV_1$ | $Content_1$ | $VB_1$ |
| 2 | $A_2$ | $E_2$ | $C_2$ | $PV_2$ | $EV_2$ | $Content_2$ | $VB_2$ |
| ... | | | | | | | |
| n | $A_n$ | $E_n$ | $C_n$ | $PV_n$ | $EV_n$ | $Content_n$ | $VB_n$ |

PROGRAM THREAD SYNCRONIZATION FOR INSTRUCTION CACHELINES

This application is related to U.S. application Ser. No. 11/272,197, filed Nov. 10, 2005, the entire contents of which are hereby incorporated by reference.

FIELD OF THE INVENTION

The present invention relates to synchronization of program threads.

BACKGROUND OF THE INVENTION

A computer system may include two or more interconnected processors that execute multiple program threads concurrently. Such a multiprocessor computing system allows a computing task to be completed more quickly by dividing the task into smaller tasks which are performed concurrently by the various processors.

A multiprocessor system may include a number of processors formed on separate computer chips which are then assembled into a multiprocessor system. Such systems are also referred to as parallel computing systems. Increasingly, computer chips are being manufactured that include multiple processors (or "cores") on a single computer chip. Such single-chip multiprocessors tend to occupy less space and to better facilitate communication between the processors than traditional multiprocessor systems.

In either case, synchronization is typically required among the threads executed by a multiprocessor system. For example, interdependencies among the threads may require that one or more threads produce a result before one or more other threads make use of the result. Thus, it may be necessary to utilize a synchronization barrier in which each thread to be synchronized is allowed to execute until it reaches a barrier, the thread is stalled at the barrier until the other threads reach the barrier; and, then, the threads are allowed to resume execution.

Conventional synchronization techniques may require that a counter is shared by all of the threads to be synchronized. The counter is incremented by each thread that arrives at the barrier. Each thread repeatedly tests whether the counter has reached a given value to determine whether the other threads have also reached the barrier. Because each thread contends for access to it, the counter may become a hot spot. To lessen contention for the counter, the threads may test less often; however, this may increase the time required for each thread to learn that the barrier has been reached.

Alternatively, a synchronization mechanism can be implemented by specialized hardware. However, this can complicate the design and manufacture of multiprocessor system that includes such specialized hardware and can limit flexibility of the system.

SUMMARY OF THE INVENTION

The present invention is a method of and system for program thread synchronization. In accordance with an embodiment of the invention, a method of synchronizing program threads for one or more processors is provided. An instruction cache line for each of a plurality of program threads to be synchronized is determined. For each processor executing one or more of the threads to be synchronized, execution of the thread is halted at a barrier by rendering the determined instruction cache line unavailable. Execution of the threads resumes by rendering the determined instruction cache lines available.

In accordance with another embodiment of the invention, a system is provided for synchronizing program threads for one or more processors. One or more processors execute a plurality of threads to be synchronized. Execution of the threads is halted at a barrier by a corresponding determined instruction cache line being rendered unavailable. Execution of the threads resumes upon each of the plurality of threads by rendering the corresponding determined cache line available. A filter is coupled to the plurality of processors for monitoring and selectively blocking fill requests for the instruction cache lines.

These and other embodiments are described in more detail herein.

BRIEF DESCRIPTION OF THE DRAWINGS

FIG. 2 illustrates exemplary code for a barrier procedure in accordance with an embodiment of the present invention;

FIG. 3 illustrates a table for a barrier filter in accordance with an embodiment of the present invention;

DETAILED DESCRIPTION OF THE INVENTION

The present invention provides a method of and system for synchronizing program threads executing on one or more computer processors. Execution of multiple threads is synchronized by stalling execution of each of the program threads at a barrier until all of the threads to be synchronized reach the barrier. Each thread is stalled by invalidating the cache line for a next instruction in instruction cache (I-cache) for the processor executing the thread.

To continue stalling each thread after the cache lines are invalidated, a barrier filter monitors I-cache fill requests and blocks the provision of selected cache lines to the processors. Once all of the threads to be synchronized reach the barrier, the invalidated cache lines are validated and fill requests for the cache lines are allowed. As a result, the threads resume execution. Execution can be resumed quickly because reading the validated instruction can be accomplished quickly, typically in one clock cycle.

Figure 1:
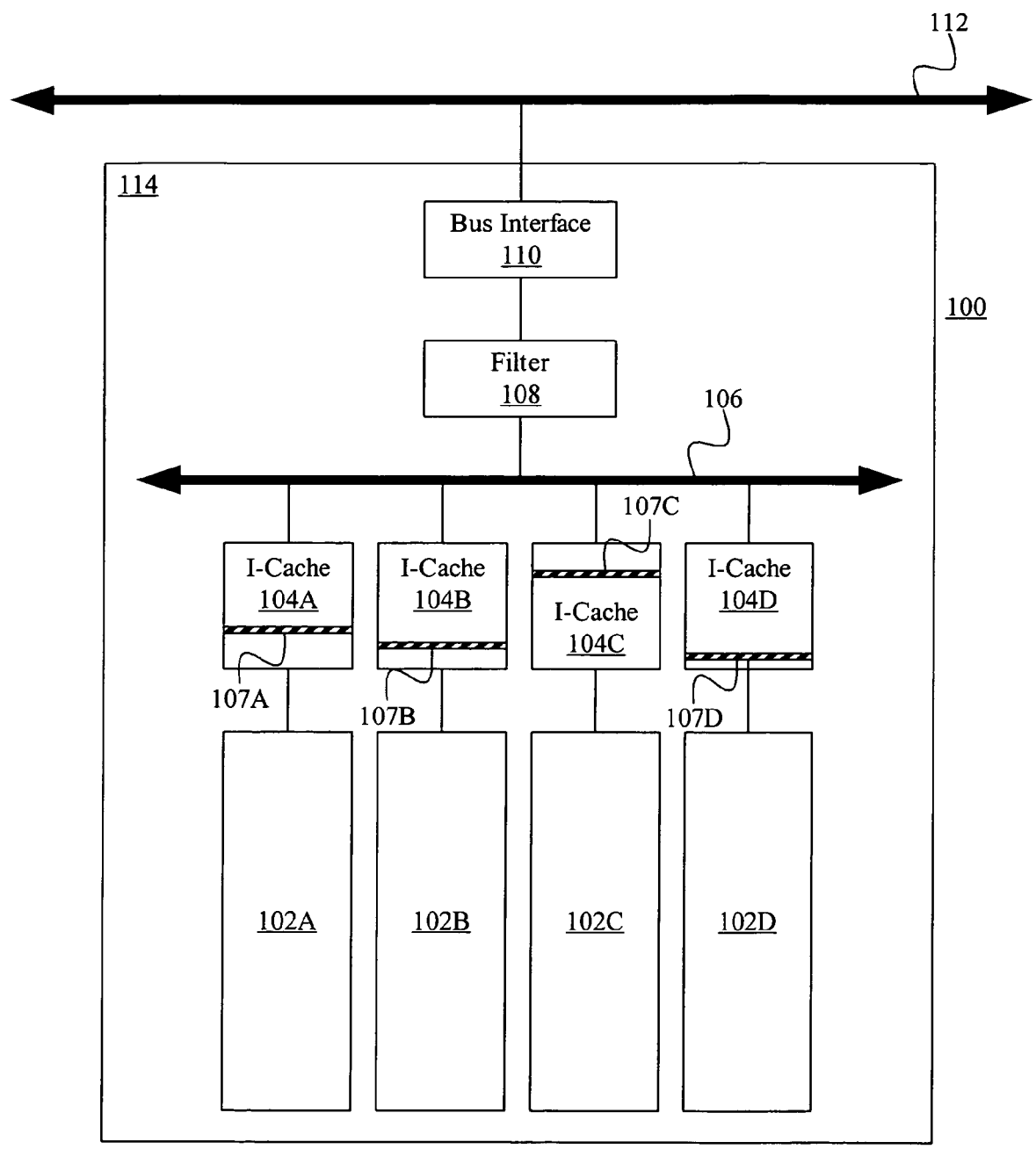
FIG. 1 illustrates a multiprocessor system in accordance with an embodiment of the present invention.

FIG. 1 illustrates a multiprocessor system 100 in accordance with an embodiment of the present invention. The system 100 includes multiple processors 102A-D. The processors 102A-D are coupled to corresponding instruction caches (I-caches) 104A-D and to an interconnect 106 via the I-caches 104A-D. A barrier filter 108 is also coupled to the interconnect 106. The interconnect 106 may comprise a local bus.

An interface 110 interfaces the processors 102A-D, I-caches 104A-D and filter 108 to a system bus 112. The system bus 112 allows the processors 102A-D to communicate with additional portions of the system 100, such as program memory, one or more outer cache levels and I/O devices (not shown). In an embodiment, the processors 102A-D, I-caches 104A-D, filter 108 and interface 110 are included in a multi-core integrated circuit chip 114. Alternatively, processors of the system 100 may be implemented by multiple integrated circuit chips. For example, the processors 102A-D may each be implemented as a separate integrated circuit chip.

Each of the processors 102A-D receives program instructions that it is to execute from its respective I-cache 104A-D. For example, the processor 102A receives its instructions from the I-cache 104A; the processor 102B receives its instructions from the I-cache 104B; and so forth. While four processors 102 are shown, it will be apparent that a multiprocessor system could have more or fewer processors.

Each I-cache 104A-D may have an associated I-cache controller (not shown). The I-cache controllers load instructions into the I-caches 104A-D by retrieving the instructions from program memory or an outer cache level (e.g., level-2 cache). As shown in FIG. 1, the I-caches 104A-D receive the instructions via the interconnect 106.

When threads are to be synchronized, each is stalled at a barrier while it awaits the arrival of the other threads to the barrier. As mentioned, to stall a thread executing on a processor, the cache line for a next instruction to be executed by the processor is invalidated. The striped lines 107A-D in the I-caches 104 of FIG. 1 represent invalidated cache lines. Because invalidating a cache line will generally result in a cache miss when the processor 102 attempts to retrieve an instruction from the invalidated cache line, a fill request will be issued in an attempt to retrieve the instruction. The I-cache controller for that processor may issue such a fill request. To continue stalling the thread, such fill requests are blocked.

The filter 108 monitors, and selectively blocks, I-cache fill requests. This may be accomplished by the filter 108 monitoring the interconnect 106 for specified addresses contained in the fill requests. When a fill request is identified by the filter 108 as one that is to be blocked, the filter 108 blocks that request. This may be accomplished by the filter 108 preventing the I-cache from loading the identified cache lines or by failing to pass the identified fill request to level-2 cache.

In an embodiment, the filter 108 is informed of the presence of a barrier in advance of any of the threads reaching the barrier. Upon reaching the barrier, each of the threads to be synchronized may invalidate its own cache line. The filter 108 blocks fill requests for the invalidated cache lines until all of the threads reach the barrier. In another embodiment, the first thread that arrives at a barrier initiates synchronization by invalidating the appropriate cache lines for all of the threads to be synchronized. This thread may also notify the filter 108 to commence blocking fill requests for the invalidated cache lines.

The locations of barriers in each thread to be synchronized are determined in order to synchronize the threads. The locations will depend upon tasks to be performed by the various processors and interdependencies of the tasks. Accordingly, the locations of barriers may be determined when the threads are programmed or compiled. In an embodiment in which threads are capable of invalidating their own cache line, a barrier procedure call is placed in each thread to be synchronized at one or more appropriate synchronization points. The barrier filter 108 is informed of the presence of these barriers.

FIG. 2 illustrates exemplary code for a barrier procedure 200 in accordance with an embodiment of the present invention. The barrier procedure is named herein "barrier( )" and includes two parts: a head 202 and a tail 204. The head 202 invalidates the instruction cache line that contains the tail 204. The tail 204 is contained in the cache line upon which the threads synchronize.

The program text of the barrier procedure 200 is preferably aligned with cache lines in I-cache 102 and begins at an address given as A, which is the starting address of the head 202 of the barrier. The size of the I-cache lines is given as L, which is typically smaller than that of outer cache levels. Preferably, the second line of the program text of the barrier procedure in I-cache contains the tail 204. Thus, the address for the second line may be given as A+L.

As shown in FIG. 2, the head 202 includes an instruction to invalidate the cache line which contains the tail 204 (i.e. the next line at address A+L is invalidated). This invalidate instruction may be, for example, an instruction cache block invalidate instruction (ICBI), which is shown in FIG. 2 as operating on exemplary address $17, an flush-cache (fc) instruction or another appropriate instruction. The invalidate instruction is preferably propagated throughout the cache hierarchy and eventually to the filter 108. This purges any copies of the invalidated cache line from cache levels between the processor 102 and the filter 108 in order to help ensure that the thread will stall on fetching the invalided cache line at address A+L.

The head 202 may also include an instruction to discard pre-fetched instructions. This purges any copies of the invalidated cache line that may have been pre-fetched and kept internally to the processor 102. As shown in FIG. 2, this may be accomplished with an ISYNC instruction.

The tail 204 of the barrier procedure 200 informs the filter 108 that the current thread is exiting the barrier. This is so that the filter 108 can block any future fill requests for address A+L coming from this thread. Blocking future fill requests avoids one thread running ahead of the other threads such that it reaches and surpasses another barrier (or another instance of the same static call to the barrier procedure) before the other threads have exited the current barrier. As shown in FIG. 2, this may be accomplished by the thread invalidating another, predetermined I-cache line that contains dead code (i.e. unaccessed code). As is also shown in FIG. 2, the address of this line is exemplary address $18, and is referred to herein as address E. The identity of the processor 102 (i.e. the processor ID) making this invalidation is carried with the request, enabling the filter 108 to identify which thread it should stop servicing requests from. It will be apparent, however, that informing the filter 108 that a thread is exiting the barrier may be accomplished in other ways. For example, some other instruction may be issued in the tail that is recognized by the filter 108.

As is also shown in FIG. 2, the tail 204 includes a return instruction (ret) which causes execution to resume after the thread is released from the barrier. The return instruction may be followed by non-operations ("nops") to pad the tail 204 up to a next cache line boundary. A thread may contain several calls to the barrier procedure 200, but need have access to only a single copy of the procedure.

FIG. 3 illustrates a table 300 for a barrier filter 108 in accordance with an embodiment of the present invention. The table 300 may be used by the filter 108 for keeping track of the status of various barriers. For example, the table 300 may be stored in level-2 cache, in hardware that implements cache control, or in hardware that implements control of the filter 108. An entry in the table 300 may be made for each barrier; as shown in FIG. 3, information for each barrier is arranged in a row. The barriers may be identified by number, such as 1 through n as shown in FIG. 3. For each barrier, the table 300 may include a field 302 for the address A, a field 304 for the address E, a counter C field 306, a pending vector field 308, an exited vector field 310 and a valid bit field 314. The pending vector and the exited vector may include one bit corresponding to each thread to be synchronized. Thus, where N threads are to be synchronized, these vectors each have N bits. Each application may only require one barrier which is used repeatedly by the application and, thus, the table 300 may have only a single entry.

The filter table 300 may be initialized at the beginning of an application. Thus, support of the operating system may be required to provide the physical addresses of the head and tail parts of the barrier, that is, the addresses A and E.

Figure 4:
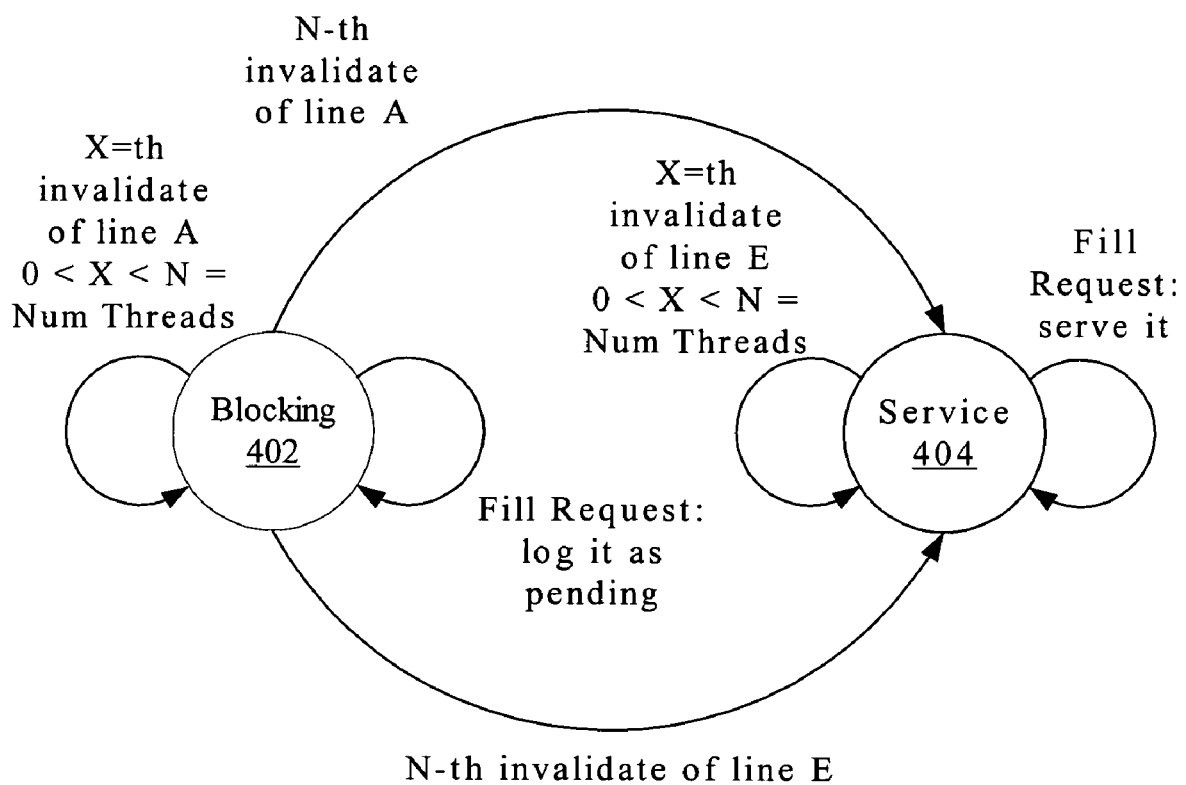
FIG. 4 illustrates a state diagram for operation of a barrier filter in accordance with an embodiment of the present invention.

FIG. 4 illustrates a state diagram for operation of a barrier filter 108 in accordance with an embodiment of the present invention. A finite state machine (or automaton) for a particular barrier has two main states: a blocking state 402 and a service state 404. When an entry is inserted into the table 300, its corresponding automaton is initially in the blocking state 402, its counter C (field 306), its pending vector (field 308) and its exited vector (field 310) are set to zero. In addition, the valid bit (field 314) is set to indicate that the corresponding I-cache line is invalid.

In the blocking state 402, the filter 108 processes each incoming cache fill request by checking to see whether the target address is blocked. This may be accomplished by the filter 108 comparing the target address for fill requests to its address A entries in column 302 of the table 300. The fill requests will target the address immediately following the address A (i.e. address A+L) though the filter 108 may identify these requests based on its knowledge of the address A. If the target address is blocked, the filter 108 does not pass the requested cache line to the corresponding I-cache. Instead, the filter 108 may obtain the requested cache line from memory and store it in the corresponding cache line content field 312 of the table 300. The filter 108 may then set the bit in the pending vector (field 308) that corresponds to the requesting processor 102 to indicate that the processor 102 has reached the barrier and has a pending request. Otherwise, if the target address is not blocked, the filter 108 passes the requested cache line to the corresponding processor 102.

In addition to monitoring fill requests in the blocking state 402, the filter 108 monitors invalidate instructions issued by the processors 102. For each invalidate that targets address A+L, the filter 108 increments the corresponding counter C (field 306) in the table 300. The filter 108 remains in the blocking state until the counter C reaches N, the number of threads to be synchronized. Once the counter C reaches this number, this indicates that all of the threads to be synchronized have reached the barrier. At this point, the automaton for the barrier moves to the service state 404 and resets the valid bit (field 312) to indicate that the cache line content is valid. Thus, the filter 108 monitors invalidate requests to determine when each thread has reached the barrier. It will be apparent that the filter 108 could monitor other messages from the processors to determine when each thread has reached the barrier. For example, the filter 108 could monitor stores to specific locations.

In the service state 404, the pending fill requests are serviced. New fill requests arriving while in the state 404 are serviced as well. As in the blocking state 402, the filter 108 processes each incoming cache fill request by checking to see whether the target address is blocked. However, in the service state for a particular barrier, the corresponding address A+L is not blocked. Thus, those fill requests are serviced. In the service state 404 the filter 108 monitors invalidate instructions targeting the address E for the barrier. The filter 108 identifies which processor issues each invalidate targeting the address E and sets corresponding bit in the exited vector (field 310) to indicate which threads have exited the barrier. Once the bit in the exited vector corresponding to a processor 102 is set, the filter 108 will not service any further fill requests from that processor 102 that target the address A+L for the barrier.

When setting the corresponding bit in the exited vector (field 310) would cause the vector 310 to have all of its bit equal to one, this indicates that all of the N threads have been synchronized and have exited the barrier. Accordingly, the automaton for the barrier returns to the blocking state 402. In addition, the counter C (field 306), the pending vector (field 308) and the exited vector (field 310) are cleared. The cache line content (field 312) need not be cleared since it may be reused. This process of selectively blocking fill requests (in the blocking state 402) and then servicing the requests (in the service state 404) is repeated for each barrier instance encountered as the threads are executed.

In another embodiment, the first thread that arrives at a barrier initiates synchronization by causing the appropriate cache lines to be invalidated for all of the threads to be synchronized. This thread also notifies the filter 108 to commence blocking fill requests for the invalidated cache lines. Threads that reach the barrier subsequent to the first thread already have their cache lines invalidated so that when they attempt to read this cache line, they stall at the barrier. Preferably in this embodiment, threads that reach the barrier after the first thread do not attempt to invalidate the cache lines of the other threads.

So that a thread can determine whether it is the first thread to reach the barrier, each thread may request exclusive access to a memory location in the system 100 (FIG. 1) when it reaches the barrier. For example, each thread may acquire a lock from the OS of the system 100 so that the thread has exclusive access to a value stored at the memory location. The thread then checks the value and, from the value, the thread infers whether it is the first thread to reach the barrier. For example, a value of zero may indicate that the thread is the first thread. If the thread is the first thread, it also changes the value so that when the other threads check the value, they will infer from the value that they are not the first thread. For example, a value of one may indicate that the first thread has already arrived at the barrier.

For this embodiment, the barrier procedure may be modified from that shown in FIG. 2 so that, in the head portion 202, each thread causes the designated memory location to be checked to determine whether a thread is the first thread to reach the barrier and, if so, to invalidate the cache lines of the other threads. These invalidates must also invalidate any prefetch buffers between the other threads' processor instruction fetch mechanism and the filter as well as their L1 caches. The head 202 may also include code to cause the first thread to insert the current barrier into the table 300 of the filter 108, if there is not an entry corresponding to the thread already in the table 300. In this embodiment, once the filter table 300 has an entry for the barrier and the filter 108 has been informed that the first thread has reached the barrier, operation of the filer 108 may commence in the blocking state 402 as explained above in connection with the blocking state 402. Once all of the threads have reached the barrier, operation of the filter 108 may commence in the service state 404, as explained above, and may then return to the blocking state 402.

In an embodiment of the invention, the OS of the system 100 provides support for implementing the barriers. In this case, the OS accesses the filter 108 so as to save and to restore the state of the filter 108, possibly including the table 300, in the event of context changes, such as when an application is de-scheduled or a page holding program text is swapped out of memory. In case the OS does not provide such support, compensating actions may be performed elsewhere, such as by the filter 108 itself. For example, the filter 108 may monitor the OS to identify context changes by associating process identifications of the threads to contexts. The filter 108 may then associate the process identifications with the barriers in its table 300. In this way, the filter 108 may invalidate cache lines and block fill requests for each processor according to the process identification for the thread currently executing on the processor. So that the filter 108 is informed of the process identification for each thread, the invalidate instructions of the barrier procedure (e.g., procedure 300 of FIG. 3) preferably carry the corresponding process identification.

In accordance with embodiments described above, it is assumed that a barrier is used to synchronize one thread per processor. Thus, there are N threads to be synchronized, one for each of N processors. In this case, the pending vector 308 and the exited vector 310 may each have N bits. Also, the counter C (field 306) indicates that all of the threads have reached the barrier when it reaches a count of N. Having one thread per processor also allows the barrier filter 108 to use the processor ID to identify threads that enter or exit a barrier. Thus, the processor ID may be carried with the invalidate request issued by threads exiting a barrier to enable the filter 108 to identify which thread it should stop servicing requests from. Accordingly, allowing one thread per processor simplifies the thread tracking performed by the filter 108. In other embodiments, there may be more or fewer threads to be synchronized than processors.

In an embodiment in which there are fewer threads to be synchronized than processors, a bit vector which indicates the threads to be synchronized for each barrier may be added to each barrier entry in the filter table 300. This vector may be referred to a participation vector. For example, where there are eight processors, but for a particular barrier, only the first five and the last one of the processors execute threads to be synchronized, the participation vector may be given as 11110001. Thus, a column may be added to the table 300 in which the participation vector entered may be different for different barriers in the table 300 so as to indicate which threads and corresponding processors participate in each barrier.

A number of bits set in the participation vector indicates the number of threads that are to participate in the corresponding barrier. This number may be used by the filter 108 to determine the count required to be reached by the counter C (field 306) to indicate that the required number of threads have arrived at the barrier. Thus, when the counter C for a barrier reaches the particular number of threads participating in the barrier, this indicates that all of the threads to be synchronized have reached the barrier. Also, the participation vector indicates which bits in the exited vector (field 310) are needed to indicate that all of the threads have exited the barrier. Thus, the filter 108 may monitor the bits of the exited vector which have been set to one, and when a thread exiting the barrier would cause the exited vector to match the participation vector, this indicates to the filter 108 that all of the threads being synchronized have exited the barrier.

In another embodiment, one or more of the processors may execute multiple threads that to be synchronized. Thus, when the first of the threads of such a processor reaches the barrier, that thread is stalled; however, the processor continues to execute each additional thread until it also reaches the barrier. To accomplish this, invalidated I-cache lines are uniquely associated with each of the threads. Thus, each thread stalls on an invalidated I-cache line that is unique to the thread. Upon exiting the barrier, each thread may invalidate a unique cache line that contains dead code to identify itself to the filter 108 and to indicate that it is exiting the barrier.

Request coalescing might otherwise occur if two or more threads executing on the same processor attempted to invalidate the same I-cache line address. This is because the system 100 may perceive all but one of the requests as superfluous and may drop them or merge the requests. Thus, using distinct cache lines for the threads defeats request coalescing and enables the filter 108 to identify the individual threads even if executing on the same processor.

So that each thread executing on the same processor invalidates a unique I-cache line, the threads may each execute a unique version of the barrier procedure 300 (FIG. 3). For example, the program code may include as many versions of the barrier procedure as there are threads to be synchronized. Each version of the barrier procedure 300 specifies a unique address A (and, thus, a unique address A+L to be invalidated for stalling the thread) and a unique address E (to be invalidated to inform the filter 108 when the thread has exited the barrier). When a thread makes a call to the barrier procedure, it jumps to its private version of the barrier procedure 300. In this case, an appropriate barrier procedure call may be inserted into each thread. Alternatively, another procedure (e.g., a trampoline code) may be called that determines the appropriate barrier procedure to call based on the identification of the thread (e.g., the process ID). In this case, the process ID is passed to this procedure.

Alternatively, rather than each thread executing a unique version of the barrier procedure 300 (FIG. 3), the barrier procedure may be modified to compute unique addresses A and E for each thread. For example, the addresses A and E may be computed as a function of each thread's process ID. In this case, the process ID is passed to the barrier procedure.

However the addresses A and E are determined for each thread, the filter 108 monitors the invalidate requests issued by the threads. The filter 108 selectively blocks fill requests for invalidated I-cache lines based on the invalidate requests issued by the threads when executing the head of the barrier procedure and that target each unique address A+L. Because fill requests are blocked selectively for each thread based on its unique address A+L, a thread may be stalled from executing on a processor while another thread may continue to execute on the same processor until it reaches the barrier. Also, because each thread issues an invalidate targeting a unique address E when exiting a barrier, the filter 108 is able to determine which threads have exited the barrier even when multiple threads are executed by the same processor.

In an embodiment, the filter 108 identifies invalidate requests as belonging to a particular barrier based on the addresses A+L and E targeted by the request (in addition to identifying the particular thread, as explained above). This allows the filter 108 to determine when all of the threads to be synchronized have arrived at a particular barrier and when they have exited the particular barrier. This may be accomplished by the filter 108 storing a bit pattern or mask for the addresses A+L and E for each barrier in the fields 302 and 304 of the table 300 rather than the addresses themselves. The pattern for the field 302 may be given as AP, while the pattern for field 304 may be given as EP. Thus, given a predetermined mask M, an invalidate request targeting address X is identified as belonging to the barrier if M AND X equals AP, where "AND" is a logical AND operation.

Figure 5:
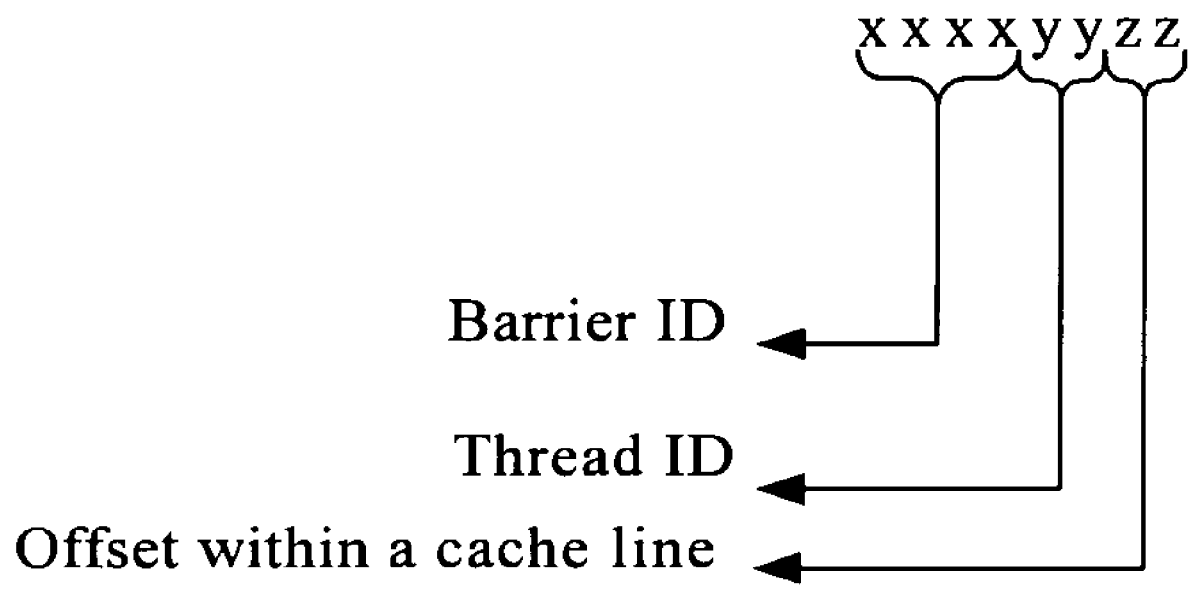
FIG. 5 illustrates an address structure in accordance with an embodiment of the present invention.

The mask M may be selected such that higher order bits of X specify the particular barrier and the lower order bits specify the particular thread. Assume that addresses can be encoded on 8 bits, and that the size of cache lines is four bytes. Therefore, the first four addresses 00000000 through 00000011 are contained in the first cache line, and 00000100 is the address of the beginning of the second cache line. In general, the beginning address of a cache line has its two lowest-order (rightmost) bits equal to 0. We can also decide that cache lines participating in the same barrier have the same high-order bits. For example, an 8-bit address can have a structure as shown in FIG. 5, where x, y and z represent a bit. Thus, the first four bits are represented as xxxx identify a specific barrier, the next two bits are represented as yy and identify a specific thread and the last two bits are represented as zz and specify offset within a cache line. In the example, cache lines are four bytes, so zz is 00.

A valid mask M may be 11110000. Now assume the addresses A+L targeted by two different threads are: $(A+L)_1$=11010000 and $(A+L)_2$=11010100. In this case, M AND $(A+L)_1$ yields 11010000, as does M AND $(A+L)_2$. Thus, the first four bits of the addresses $(A+L)_1$ and $(A+L)_2$, which are 1101, are the same and, thus, specify the same barrier. In this case, the value AP of field 302 for this particular barrier is 1101, with the lower order bits being "don't cares." The next two bits of the targeted address specify the particular thread. Thus, the thread that issued the invalidate request for address $(A+L)_1$ or $(A+L)_2$ can be distinguished by the filter 108 examining bits five and six (bits "yy"). For address $(A+L)_1$ these bits are 00 and for address $(A+L)_2$, these bits are 01. Bits 7 and 8 can be ignored by the filter 108.

Invalidate requests for address E may be handled similarly. For example, the value EP for field 304 for this same barrier may be given as 1100. This value differs from the value AP so that the filter 108 is able to distinguish between invalidates that target the address A+L and those that target the address E. However, bits five and six may still be used to identify the particular thread. Thus, in the example, an invalidate request targeting address 11000100 can be identified as an E invalidate issued by thread 01 for the same barrier as in the example above. It will be apparent that different bits of the targeted addresses A+L and E may be used to identify the particular barrier and the particular thread.

Figure 6:
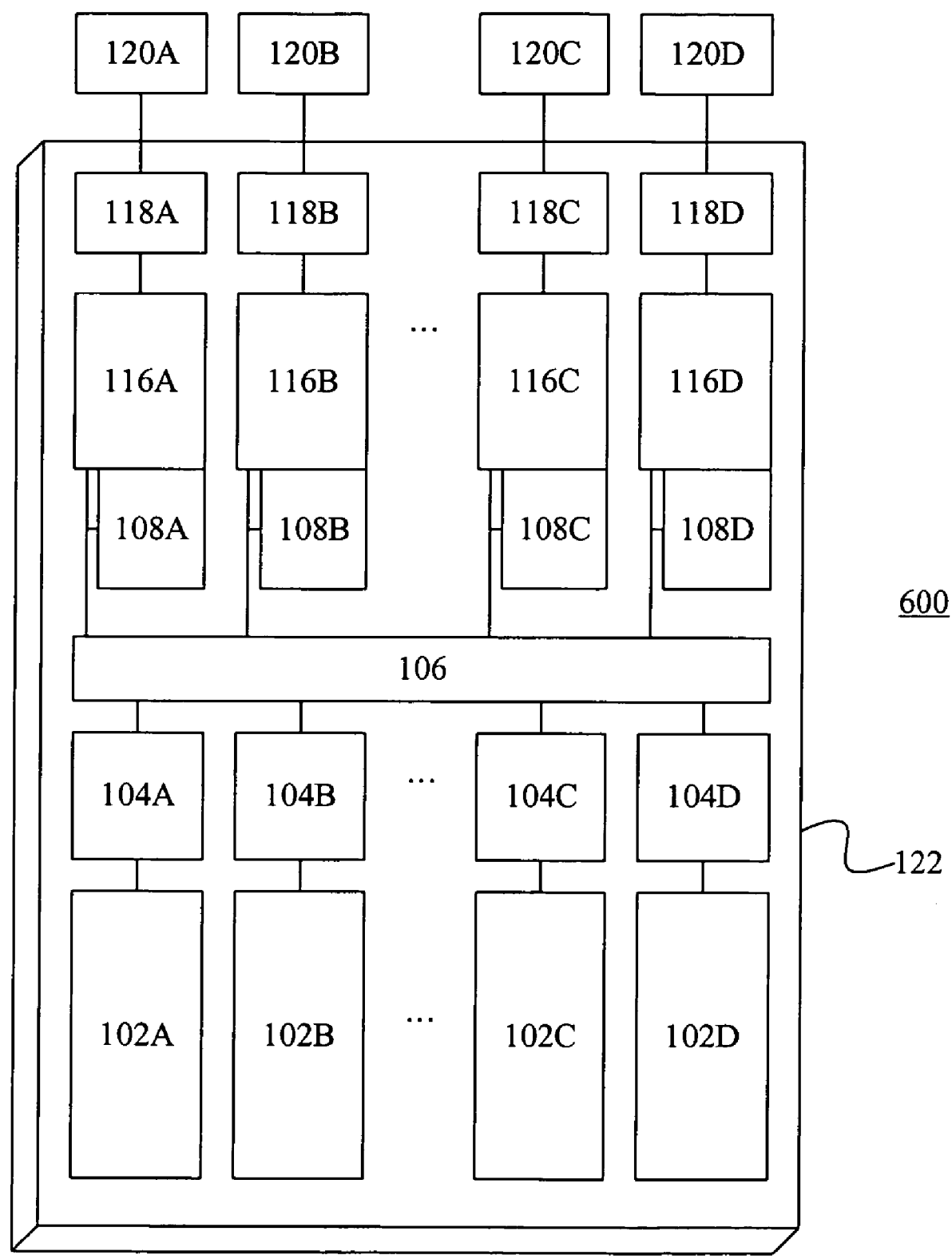
FIG. 6 shows an alternative embodiment of a multi-processor system in which functions of a barrier filter are distributed in accordance with an embodiment of the present invention.

FIG. 6 shows an alternative embodiment of a multi-processor system 600 in which functions of a barrier filter 108 are distributed in accordance with an embodiment of the present invention. Similarly to the system 100 of FIG. 1, the system 600 of FIG. 6 includes multiple processors 102A-D which are coupled to corresponding instruction caches (I-caches) 104A-D and to an interconnect 106 via the I-caches 104A-D.

The system 600 of FIG. 6 differs from that of FIG. 1 in that the filter 108 comprises distributed filter elements 108A-D. Each distributed filter element 108A-D is associated with a corresponding one of the processors 102A-D and a corresponding one of the I-caches 104A-D. The filter elements 108A-D are coupled to the interconnect 106 and to level-2 cache memories 116A-D. In a preferred embodiment, each filter element 108A-D is incorporated into a level-2 cache controller which controls the corresponding level-2 cache 116A-D. In addition, each filter element 108A-D may be identical to the others, except that only one filter element 108A-D performs all of functions for implementing a particular barrier. Thus, each element 108A-D may have a different table 300 which includes only those barriers assigned to it.

As shown in FIG. 6, the filter elements 108A-D may be outside the communication paths between the interconnect 106 and the level-2 caches 116A-D. Accordingly, the filter elements 108A-D are outside the critical communication path for incoming requests and outbound responses between the processors and memory; this avoids the filter 108 causing delay in such communications. However, the filter elements 18A-D monitor these communications so that they can invalidate operations and fill requests and can selectively block fill requests for any of the processors 102A-D.

The system 600 may also include memory controllers 118A-D which control accesses to memories 120A-D. Similarly to the system 100 of FIG. 1, the processors 102A-D may be implemented as a multi-core integrated circuit chip 122. Alternatively, processors of the system 600 may be implemented by multiple integrated circuit chips.

In systems with multiple multi-core chips, several techniques for large-scale barrier synchronization are presented. In one embodiment, filter hardware (which implements filter 108) is present within each chip, as explained above, and conventional software barrier techniques are used for synchronization between chips. In this case, the barrier is broken down into two stages. Once the participating cores on one chip have reached the first stage, one core on the chip executes a software barrier with other threads each on different chips by inter-chip communications among the participating chips. Once this software barrier is complete, the threads on each chip are signaled to proceed.

In an alternative embodiment, barriers are processed hierarchically by a combination of intra- and inter-chip communication. One chip's filter is designated as a home filter for a given barrier address, in the way that memory addresses in a NUMA multiprocessor have home locations. Non-home filters participating in a barrier aggregate their arrivals at the barrier before communicating with the home filter. For example, if a chip has eight cores participating in a barrier, but is not the home node, its filter can wait until each of its 8 cores has reached the barrier (using techniques described above) before communicating to the home filter. The home filter requires state bits corresponding to the summarized status of each other processor chip in the shared memory system. This can be faster than the software method described above, but may be less scalable for systems with very large numbers of chips.

In yet another embodiment, inter-chip synchronization may be performed with conventional hardware synchronization networks, such a global AND/OR tree networks. This results in a hybrid hardware mechanism.

It will be apparent that computer-readable media may be provided having stored thereon computer code for performing any of the functions described herein. For example, the computer code may be loaded from the computer-readable media to the system 100 or 600 for causing the system 100 or 600 to operate in accordance with the teachings herein.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method of synchronizing program threads for one or more processors comprising:
   determining an instruction cache line for each of a plurality of program threads to be synchronized;
   for each processor executing one or more of the threads to be synchronized, halting execution of the one or more threads at a barrier by rendering a corresponding determined instruction cache line unavailable; and
   resuming execution of the threads by rendering the determined instruction cache lines available.

2. The method according to claim 1, wherein said rendering the determined instruction cache line unavailable for each thread comprises invalidating cache lines for each of the threads.

3. The method according to claim 2, wherein said rendering the instruction cache line unavailable further comprises inhibiting a fill request for the cache line.

4. The method according to claim 3, wherein said inhibiting is performed by a filter that monitors cache fill requests and selectively blocks the fill request for the cache line.

5. The method according to claim 4, wherein the filter is informed when each of the plurality of program threads resumes execution.

6. The method according to claim 4, wherein the filter accesses a table for tracking the status of the barrier.

7. The method according to claim 4, wherein the filter is positioned outside a critical path between the processors and memory.

8. The method according to claim 4, wherein the filter comprises an automaton having a blocking state in which the filter selectively blocks fill requests for the determined cache lines and a service state in which the filter services the fill requests.

9. The method according to claim 4, wherein the filter monitors invalidate requests issued by the threads to determine when each thread has reached the barrier.

10. The method according to claim 4, wherein the filter identifies context changes by associating process identifications of the threads to contexts.

11. The method according to claim 2, wherein each of the plurality of the threads invalidates its corresponding cache line.

12. The method according to claim 11, wherein each of the plurality of threads invalidates its corresponding cache line by executing a called procedure, the procedure comprising a head for invalidating the corresponding cache line and a tail that comprises the invalidated cache line.

13. The method according to claim 12, wherein execution of the tail indicates that the corresponding thread has resumed execution.

14. The method according to claim 2, wherein a first thread of the plurality to arrive at the barrier invalidates cache lines for other threads of the plurality.

15. The method according to claim 14, wherein the first thread of the plurality to arrive at the barrier to arrive notifies a filter for inhibiting fill requests for the cache lines.

16. The method according to claim 14, wherein the first thread of the plurality to arrive at the barrier determines that is the first thread of the plurality to arrive at the barrier by accessing a memory location and altering a value stored at the memory location.

17. The method according to claim 1, wherein a number of threads of the plurality of threads is less than a number of the processors.

18. The method according to claim 1, wherein at least two of the plurality of threads executes on the same one of the processors.

19. The method according to claim 18, wherein at least one of the at least two threads thread continues to be executed on the one of the processors while another of the at least two threads is halted.

20. The method according to claim 18, wherein each of the at least two threads requests invalidation its corresponding cache line using a unique cache address and wherein each of the at least two threads invalidates its corresponding cache line by calling a unique procedure.

21. The method according to claim 18, wherein each of the at least two threads requests invalidation its corresponding cache line using a unique cache address and wherein the unique cache address for each of the at least two threads is computed as function of a corresponding process identification.

22. The method according to claim 18, wherein each of the at least two threads requests invalidation its corresponding cache line using a unique cache address and wherein the unique cache address corresponds to a particular barrier as well as to a particular one of the at least two threads.

23. The method according to claim 22, wherein identification of the barrier is determined by performing a logical operation taking the unique cache address and a predetermined bit pattern as inputs to the logical operation.

24. A system for synchronizing program threads for one or more processors comprising:
   one or more processors executing a plurality of threads to be synchronized, execution of the threads being halted at a barrier by a corresponding determined instruction cache line being rendered unavailable and execution of the threads resuming by rendering the corresponding determined cache line available; and
   a filter coupled to the plurality of processors for monitoring and selectively blocking fill requests for the instruction cache lines.

25. The system according to claim 24, wherein the instruction cache lines for each of the plurality of threads are rendered unavailable by invalidating the cache lines.

26. The system according to claim 24, wherein the filter monitors requests issued by the threads to determine when each thread has resumed execution.

27. The system according to claim 24, wherein each of the plurality of the threads invalidates its corresponding cache line.

28. The system according to claim 27, wherein each of the plurality of threads invalidates its corresponding cache line by calling a procedure, the procedure comprising a head for invalidating the cache line and a tail that comprises the invalidated cache line.

29. The system according to claim 24, wherein a first thread of the plurality to arrive at the barrier invalidates cache lines for other threads of the plurality.

30. A computer readable media having stored thereon computer code for performing a method of synchronizing program threads for one or more processors comprising steps of:
   determining an instruction cache line for each of a plurality of program threads to be synchronized;
   for each processor executing one or more of the threads to be synchronized, halting execution of the one or more threads at a barrier by rendering a corresponding determined instruction cache line unavailable; and
   resuming execution of the threads by rendering the determined instruction cache lines available.

* * * * *

UNITED STATES PATENT AND TRADEMARK OFFICE
CERTIFICATE OF CORRECTION

PATENT NO.          : 7,555,607 B2
APPLICATION NO.     : 11/271535
DATED               : June 30, 2009
INVENTOR(S)         : Jean-Francois C. P. Collard et al.

It is certified that error appears in the above-identified patent and that said Letters Patent is hereby corrected as shown below:

On the Title page, in field (54), in "Title", in column 1, line 1,
delete "SYNCRONIZATION" and insert -- SYNCHRONIZATION --, therefor.

In column 1, line 1, delete "SYNCRONIZATION" and insert
-- SYNCHRONIZATION --, therefor.

Signed and Sealed this

Tenth Day of November, 2009

David J. Kappos
*Director of the United States Patent and Trademark Office*